Patented May 17, 1932

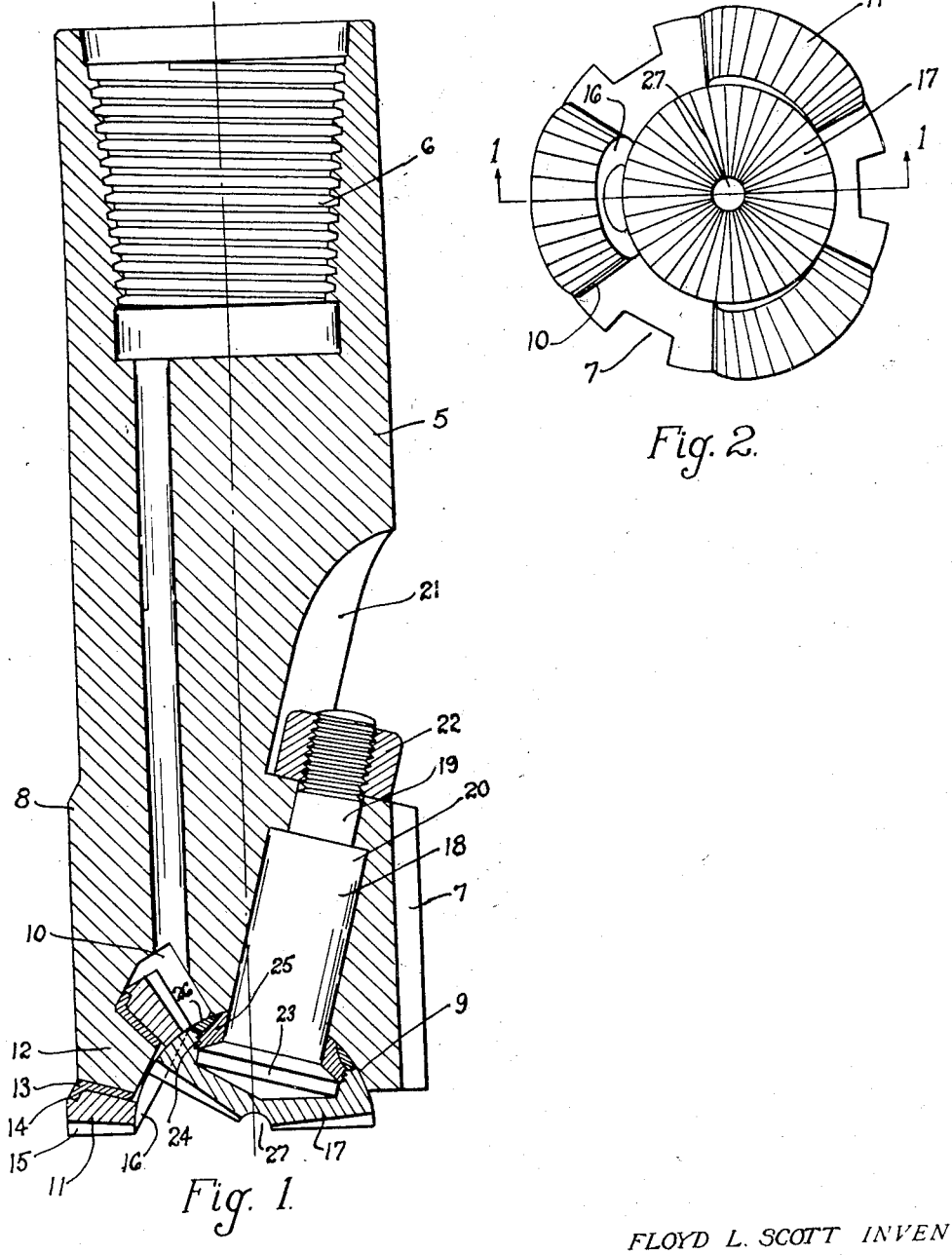

1,858,282

UNITED STATES PATENT OFFICE

FLOYD L. SCOTT, OF HOUSTON, TEXAS, ASSIGNOR TO HUGHES TOOL COMPANY, OF HOUSTON, TEXAS, A CORPORATION OF TEXAS

WELL DRILL

Application filed January 18, 1930. Serial No. 421,691.

My invention relates to well drills employed in drilling deep wells for oil, gas, water and the like.

It is an object of the invention to provide a drill which is of the roller type adapted to drill comparatively hard formations, and which is simple in structure, easy to assemble, and reliable in use.

It is an object to provide a drill with a plurality of rolling cutters all of which may be held in place by one securing element easily and quickly applied.

I also desire to construct the drill so that it may have a superior cutting effect upon the material being drilled.

Referring to the drawings herewith, I have shown one embodiment which my invention may take. Fig. 1 is a central longitudinal section through the device, taken on the line 1—1 of Fig. 2. Fig. 2 is a bottom plan view thereof.

The drill includes a head 5, the upper end of which has a socket 6 threaded to connect with a drill collar or tool joint, not shown. The head is approximately cylindrical, the lower end being slightly enlarged at 8, said lower end having longitudinal flutes 7 therein, to allow the passage of flushing fluid and detritus.

The lower end of the head has a hemispherical recess 9 therein and this recess is further cut away about its periphery to provide three equally spaced pockets 10 to receive cutters 11.

Said cutters 11 are spaced 120° apart and are mounted upon stub shafts 12 formed integrally with the head and extended at a downward inclination inwardly toward the center of the head. These shafts are tapered and are each fitted with a tapered bushing 13, the outer end of which has a short radial flange 14.

The cutters are preferably frusto-conical in shape, and are toothed at 15 to cut the bottom of the hole adjacent the outer wall of said hole. The forward ends of said cutters are formed with a concave recess 16, cut approximately on the surface of a sphere.

There is also a central cutter 17 to cut the central portion of the well bottom. Said cutter is mounted upon the detachable shaft 18 set in a position inclined upwardly in the head as shown. Said shaft is reduced in outer diameter toward its upper end at 19 to form a shoulder 20 and the opening in the head within which the shaft fits is also shouldered to form a thrust stop for said shaft in said head. The upper end of the shaft projects into a pocket 21 in the side of the head, and a nut 22 screwed upon said shaft serves to secure it in position.

The lower end of the shaft 18 has a head 23, the forward end of which is tapered abruptly to an apex. The cutter 17 has an upper recess to fit the forward end of the head and this recess is threaded at 24 to engage a retaining ring 25 which fits above the head 23 of the shaft and holds the cutter upon its bearing upon the head. The retaining ring may be secured from unscrewing by a bond of welding material 26 if desired. The forward end of the cutter 17 is tapered downwardly and is toothed to cut the bottom of the hole. There is a central depression 27 at the point of the cutter to assist in centering the drill. The upper side of the cutter is spherical to fit within the recess 9 previously referred to.

It will be seen that the cutter 17 serves to lock the side cutters 11 on their shafts. When the cutters are assembled, the side cutters 11 will be first placed in position upon their shafts and then the cutter 17 will be mounted upon its shaft 18 and locked in position thereon by the retaining ring 25. The said shaft 18 is then inserted into its recess and secured in position by the nut 22. The spherical surface of the cutter 17 will fit against the concaved recesses 16 of each of the cutters 11 and hold them from removal from their shafts. It will be seen that when the drill is on bottom ready to drill, the cutters 11 will be urged outwardly away from the center by the thrust of the material being cut.

In operation, the cutter 17 is inclined so that it will bear at only one side upon the bottom of the hole and that side will cut an annular track on the well bottom adjacent to the center. The cutters 11 will cut a track outside the one cut by the cutter 17 and will thus cut a clearance for the drill. The drill will be supported at three points by the cutters 11 and also adjacent the center by cutter 17 and the action will be a balanced one resulting in smooth and rapid drilling.

The advantages of the structure lie in the simple structure and the rapidly operated means by which the cutters may be assembled and secured in position.

What I claim as new is:

1. A well drill including a head, a plurality of outer cutters thereon positioned to drill the outer portion of the well bottom, and a single rotatable cutter mounted to cut the center of the hole, said single cutter bearing against the inner ends of said outer cutters to hold them in position.

2. A well drill including a head, a plurality of outer cutters thereon positioned to drill the outer portion of the well bottom and a single rotatable cutter mounted to cut the center of the hole, the upper side of said single cutter being cut on the arc of a sphere and adapted to bear against the inner ends of said outer cutters.

3. A well drill including a head, a set of three outer frusto-conical shaped roller cutters mounted on inwardly projecting shafts integral with said head, a single inner rotary cutter and a removable upwardly-projecting shaft for said inner cutter, said inner cutter acting to prevent removal of said outer cutters from their shafts.

4. A well drill, including a head, a set of three outer cutters mounted on inwardly projecting shafts integral with said head, a single inner cutter and a removable upwardly-projecting shaft for the inner cutter, the forward ends of said outer cutters being concaved and said single cutter being convex on its upper end to fit against and retain said outer cutters in position.

5. A well drill including a head, a plurality of outer roller cutters mounted in a position inclined downwardly and inwardly, a central cutter, a separate shaft therefor inclined upwardly and outwardly, and adapted to be removed from said head, all of said outer cutters being retained in position by said central cutter.

6. A well drill including a head, a plurality of downwardly and inwardly inclined roller cutters on said head to cut the outer portion of the well bottom, a central cutter, a separate shaft therefor inclined upwardly and outwardly and adapted to be removed from said head, the rearward side of said central cutter being positioned to bear against the forward ends of said outer cutters and retain said outer cutters on their shafts.

In testimony whereof, I hereunto affix my signature this 13th day of Jan., A. D. 1930.

FLOYD L. SCOTT.